United States Patent [19]

Khoi

[11] Patent Number: 4,821,570
[45] Date of Patent: Apr. 18, 1989

[54] APPARATUS FOR MEASURING THE LEVEL OF A LIQUID, IN PARTICULAR A FLAMMABLE LIQUID

[75] Inventor: Danny J. Khoi, Asnieres, France

[73] Assignee: Materiel et Auxiliaire de Signalization et de Controle Pour L'Automation - Auxitrol, Asnieres, France

[21] Appl. No.: 116,365

[22] Filed: Nov. 2, 1987

[51] Int. Cl.[4] .............................................. G01F 23/62
[52] U.S. Cl. ........................................ 73/309; 73/313; 73/DIG. 5
[58] Field of Search .......................... 73/309, DIG. 5

[56] References Cited

U.S. PATENT DOCUMENTS

| | | | |
|---|---|---|---|
| 1,516,160 | 11/1924 | Springer | 73/309 |
| 1,723,173 | 8/1929 | Huggins | 73/309 |
| 3,212,333 | 10/1965 | Tayama | 73/309 |
| 3,279,254 | 10/1966 | Zumbusch | 73/309 |
| 3,558,861 | 1/1971 | Collins et al. | 231/61.11 |
| 4,065,968 | 1/1978 | Sunagawa | 73/313 |
| 4,204,334 | 5/1980 | DelaCruz | 33/391 |
| 4,240,066 | 12/1980 | Lenox | 250/570 |
| 4,324,996 | 8/1982 | Janotta | 340/870.16 |
| 4,387,778 | 6/1983 | Wohrl | 73/309 |
| 4,422,328 | 12/1983 | Luchessa et al. | 73/313 |
| 4,426,788 | 1/1984 | Hirose et al. | 33/395 |

FOREIGN PATENT DOCUMENTS

| | | | |
|---|---|---|---|
| 529035 | 11/1954 | Belgium . | |
| 836857 | 1/1939 | France . | |
| 1033395 | 7/1953 | France | 73/DIG. 05 |
| 307771 | 5/1933 | Italy | 73/309 |
| 483887 | 8/1953 | Italy | 73/309 |
| 426310 | 6/1967 | Switzerland . | |
| 315989 | 7/1929 | United Kingdom | 73/DIG. 05 |
| 598867 | 2/1948 | United Kingdom | 73/309 |

Primary Examiner—William A. Cuchlinski, Jr.
Assistant Examiner—Thomas B. Will

[57] ABSTRACT

The apparatus comprises a vertical elongate plunger (2) which is freely suspended by its top end from a thread (3) so as to be partially immersed in the liquid. A housing (1') mounted at the top of the recipient houses a pulley (4) capable of rotating through not more than one-fourth of a turn, said pulley serving to wind the plunger suspension thread and being fixed to a counterweight (5) so that the angular position of the pulley and counterweight assembly varies as a function of the depth of plunger immersion, and consequently as a function of the depth of liquid in the recipient. A mechanism is provided for measuring and digitizing the angular position of the pulley and includes, in particular, a code disk (11) outside the housing (1') and a magnetic coupling for transmitting motion from the pulley (4) to the code disk (11) through said housing.

5 Claims, 2 Drawing Sheets

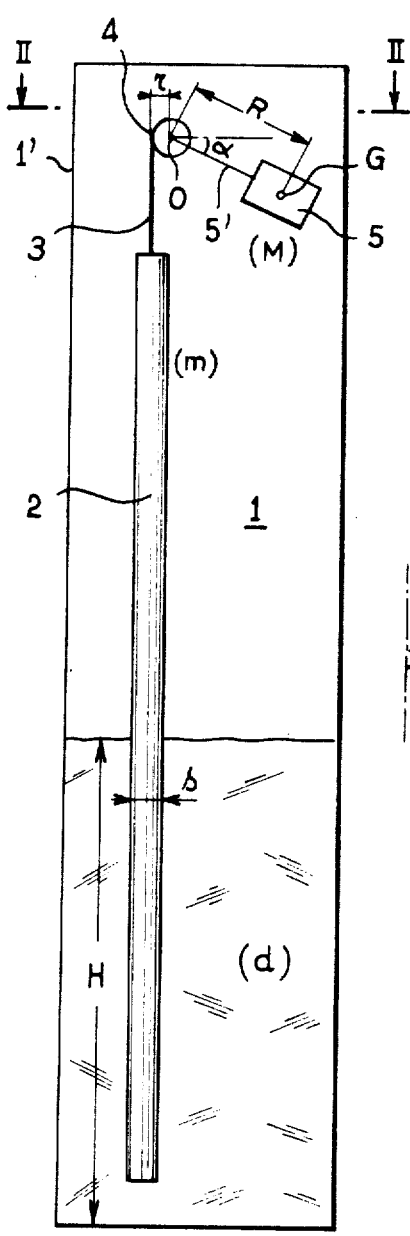
FIG_1
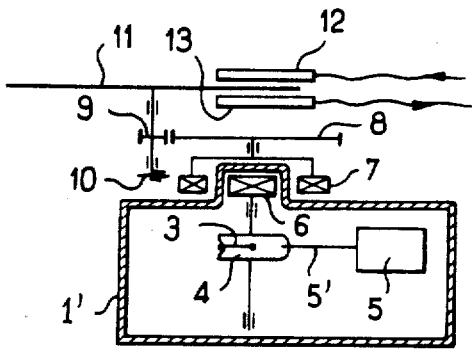
FIG_2
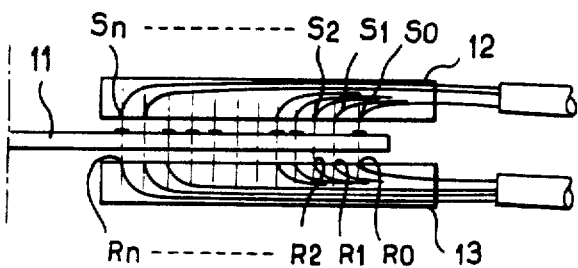
FIG_3
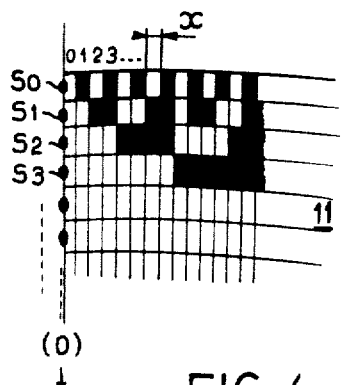
FIG_4

APPARATUS FOR MEASURING THE LEVEL OF A LIQUID, IN PARTICULAR A FLAMMABLE LIQUID

The present invention relates to apparatus for measuring the level of a liquid, and in particular a flammable liquid, in a closed receptacle.

FIELD OF THE INVENTION

The invention is mainly described in an application to measuring the level of a cryogenic liquid, however this application is in no way limiting and the invention is equally applicable to measuring the levels of other liquids, in particular motor vehicle fuels contained in tanks at refineries or service stations, liquefied gases, or any other liquid.

BACKGROUND OF THE INVENTION

There are numerous types of apparatus for measuring the level of a flammable liquid, for example there are apparatuses based on detecting the displacement of a float (direct reading apparatuses, apparatuses having a float suspended on a thread which is wound on a servo-controlled drum, ...), or on measuring variation in an electrical property (capacitance probes, resistance probes).

Because of the flammable nature of the liquid whose level is to be measured, all apparatuses which make use either directly or indirectly of electrical components must satisfy various very strict regulations requiring the apparatus to be intrinsically safe by design, or at least requiring the electrical components to be enclosed in flame-proof enclosures.

Apparatuses that make use of an Archimedes displacement plunger generally use an elastic suspension for the plunger (a system including a return spring or a torsion tube), thereby setting up a hysteresis effect and giving rise to errors in measurement which are made worse by analog electronic or pneumatic conversion devices.

Other known apparatuses, likewise using displacement plungers, constitute lever balances having the plunger connected to a system of levers which acts on gearwheels to move a pointer over a graduated scale in a read-out device. In particular, French patent No. 836,857 describes a level meter for brewing vats having a plunger capable of rising and falling depending on the depth of the liquid: the meter includes a housing receiving a system of five articulated levers which connect the plunger to a gearwheel engaging a smaller gearwheel whose shaft carries the pointer, said shaft being further connected on one side to a counterweight and on the other side to a braking dashpot.

Meters of this type are not suitable for measuring the level of a flammable liquid in a tank (measuring accuracy too low if the level varies quickly, and no genuine intrinsic safety), nor are they suitable for measuring the level of very low temperature cryogenic fluids which give rise to particularly severe operating conditions.

Further, such meters which are of traditional design, are unsuitable for use with modern measuring means that do not require a pointer to move over a graduated dial; for example they are unsuitable for use with means using pairs of coded disks as illustrated in U.S. Pat. No. 4,342,996. It should be observed that the means described in said U.S. patent make use of a large number of electrical components such that using them for measuring the level of a flammable liquid would require a highly inconvenient level of intrinsic safety to be provided.

The state of the art is further illustrated by Swiss patent No. 426,310 and U.S. Pat. No. 3,558,861 which describe other known apparatuses serving respectively to determine the Ochsle degree of wine must (or beer wort), and to observe fluctuations in water level in installations for distributing and/or storing water.

Finally, mention should also be made of measurement techniques that use electro-optical means of the type conventional for laboratory balances, and which include a moving scale having uniformly spaced transparent regions which correspond to a variable speed moving diaphragm (Belgian patent No. 529,035).

In general, in the special case of very low temperature cryogenic fluids, in particular liquid hydrogen, prior apparatuses do not give fully satisfactory results, given the very special conditions of temperature (15° K., i.e. about −258° C.), of pressure (60 bars), and of low density (0.07) applicable to liquid hydrogen.

One of the aims of the invention is to provide apparatus for measuring the level of a liquid, and in particular a flammable liquid, in which:

absolute safety is ensured by virtue of the total absence of any electrical components inside the tank or even in the proximity thereof;

very high measurement accuracy is ensured even if the level varies at high speed (when measuring the level of a propellant component in a tank feeding a rocket engine, it is essential to be able to measure depth to within a millimeter over a range of about 4 meters);

measurement is not disturbed by the fact that the level may vary either quickly or slowly; and it is possible to ensure that the tank remains completely fluid-tight since no member passes through the tank wall.

Further, it will be seen that another essential advantage of the invention is its ability to deliver digitized data representative of depth directly, said digitizing taking place in situ without using any electrical or electronic components or systems.

SUMMARY OF THE INVENTION

To this end, the present invention provides apparatus for measuring the level of a flammable liquid, in particular a cryogenic liquid, contained in a closed receptacle, the apparatus comprising:

a vertical elongate plunger freely suspended at its top end from a thread so as to be partially immersed in the liquid;

a housing mounted at the top of the receptacle and containing a pulley which is rotatable through no more than one-fourth of a turn, said pulley serving to wind the plunger suspension thread and being connected to a counterweight in such a manner that the pulley-counterweight assembly serves to compensate for the weight of the plunger as reduced by the Archimedes displacement thrust exerted on the plunger by the liquid, with the angular position of the pulley and counterweight assembly varying as a function of the depth to which the plunger is immersed, and consequently as a function of the depth of the liquid in the receptacle; and means for measuring and digitizing the angular position of the pulley, said means comprising a code disk mounted outside the housing in which the pulley and counterweight assembly is housed, together with a magnetic coupling for transmitting motion from the pulley to the code disk through said housing.

Preferably, the code disk is a binary encoded disk, and the measuring and digitizing means include light-emitting means and light-receiving means between which the said disk moves.

In which case, the light-emitting means and the light-receiving means are preferably constituted by a bundle of optical fibers terminating in the proximity of the coded regions of the disk: this makes it possible to transmit digital data remotely using optical paths without it being necessary to provide an electrical transmission system meeting the requirements of intrinsic safety.

It is also advantageous for the interval between successive sectors constituting the binary coding on the disk to decrease as a function of the angle of rotation, in accordance with a mathematical law which is selected so that the interval varies in such a manner as to compensate for the non-linearity due to the inclination of the counterweight as it moves, such that the digitized data available at the output from the light-receiving means varies linearly with the level of the liquid in the receptacle.

In accordance with another advantageous feature, the housing in which the pulley and counterweight assembly is received includes a removable sleeve in the form of a cylindrical cup serving to close said housing in sealed manner and providing magnetic coupling for transmitting motion through the cylindrical side wall of said sleeve. More particularly, the motion is transmitted outside the housing without backlash by a toothed wheel fixed to the driven member of the magnetic coupling and meshing with a smaller-diameter toothed wheel which is coaxial with the code disk; in which case it is advantageous to provide a measuring apparatus in which the driven member of the magnetic coupling is mounted on a shaft which is fixed to the cylindrical sleeve and which projects from the bottom thereof, and wherein a spiral spring is provided for taking up backlash by pressing the toothed wheel which is coaxial with the code disk against the driving toothed wheel.

BRIEF DESCRIPTION OF THE DRAWINGS

An embodiment of the invention is described by way of example with reference to the accompanying drawings, in which:

FIG. 1 is a highly diagrammatic representation of the essential components of apparatus in accordance with the invention situated, in this case, inside a single receptacle;

FIG. 2 is a plan view in section on line II—II of FIG. 1 showing the means for measuring and for digitizing an angular position;

FIG. 3 is a detail of FIG. 2 showing the structure and the disposition of the optical emitter and receiver means;

FIG. 4 is a plan view of a binary encoding disk showing the distribution of successive sectors constituting a binary code;

DESCRIPTION OF THE PREFERRED EMBODIMENT

Figures 5, 6:
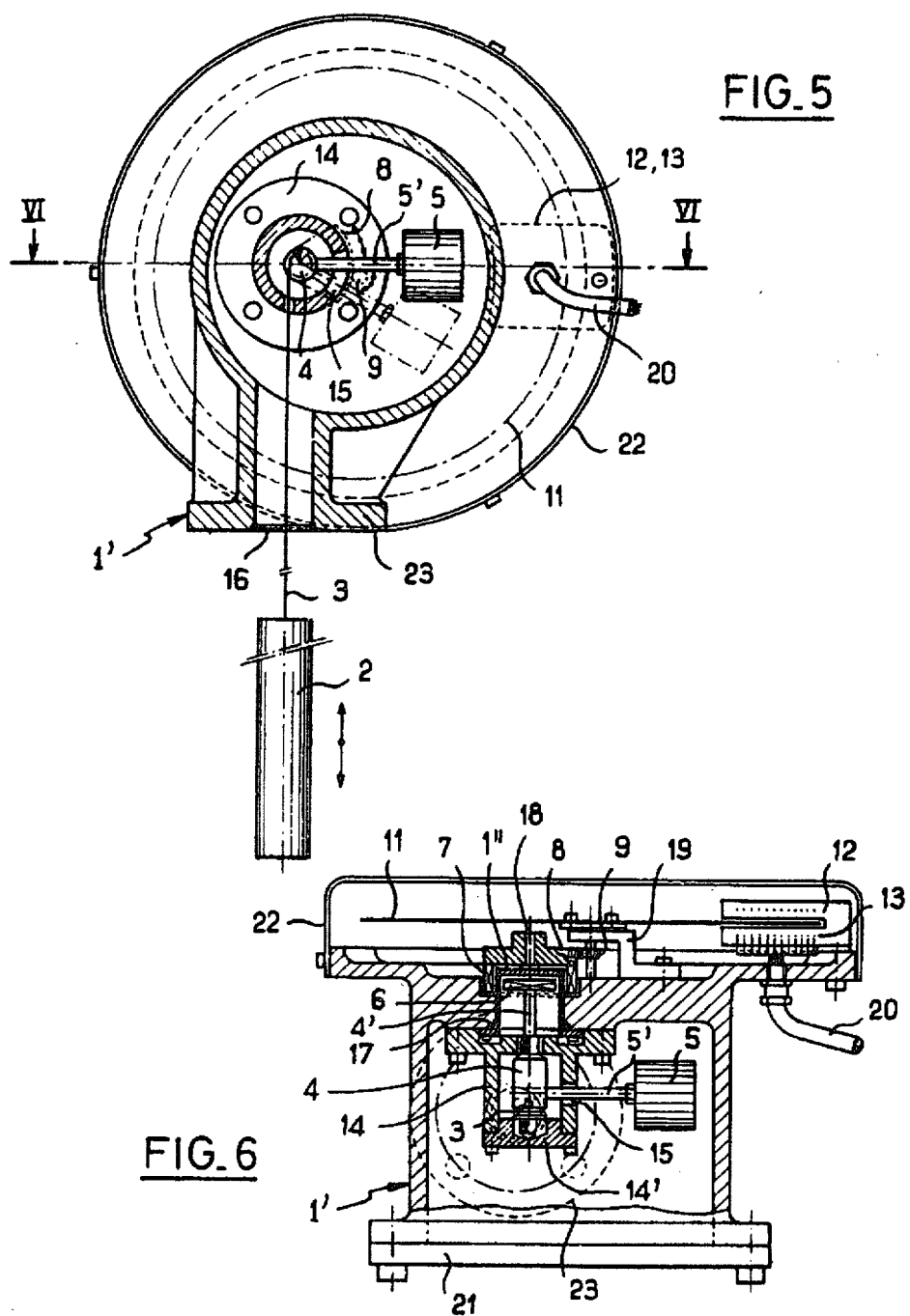
FIG. 5 is a section on a vertical plane including the plunger thread through a concrete embodiment of apparatus in accordance with the invention implementing the indications of the previous figures and showing, in particular, structural details for preserving fluid-tightness and for avoiding any backlash in transmission.
FIG. 6 is a section on line VI—VI of FIG. 5.

In FIG. 1, reference 1 designates a closed tank containing a flammable liquid whose level is to be measured. To this end, the tank is provided with an elongate plunger 2 which is partially immersed in the liquid. The plunger may be cylindrical in shape, for example, and it may be made of stainless steel, or PTFE, or any other suitable material, and it may optionally be ballasted as a function of the physical properties of the liquid.

The plunger 2 is freely suspended on a thread 3, for example a thread made of "invar" which is a cryogenic material. This thread is wound onto a small diameter pulley 4 connected to a counterweight 5 such that the pulley and counterweight assembly is capable of rotating through no more than one-fourth of a turn, with the maximum amplitude of angular displacement being preferably about one-eighth of a turn.

The assembly shown diagrammatically above operates as follows: suppose that when the tank is empty, the counterweight 5 exactly balances the weight of the thread-plunger assembly such that the segment OG (where O is the pulley axis and G is the center of gravity of the counterweight) is horizontal.

As the level of liquid rises in the tank, the displacement thrust exerted on the plunger reduces its weight so that the apparent weight of the plunger reduces with increasing liquid level. As a result, the axis OG of the counterweight will tilt below the horizontal with the thread 3 being wound onto the pulley 4.

The depth H of liquid in the tank can be deduced from the static equilibrium equation:

$$H = (1/\rho s)(m - M(R/r)\cos \alpha) + r\alpha \qquad (1)$$

where:
H is the depth of liquid in the tank,
$\rho$ is the density of the liquid,
s is the cross-section of the plunger,
m is the mass of the plunger,
M is the mass of the counterweight,
R is the distance between the center of gravity G of the counterweight and the pulley axis,
r is the radius of the pulley, and
$\alpha$ is the angle between the segment OG and the horizontal (i.e. represents the inclination of the counterweight).

Assuming that H=0 (tank empty), $\alpha=0$, i.e. the counterweight is strictly horizontal when the tank is empty, then the mass of the counterweight must be selected so that:

$$M(R/r) = m \qquad (2)$$

Such that equation (1) becomes:

$$H = (m/\rho s)(1 - \cos \alpha) + r\alpha \qquad (3)$$

It can thus be seen, that given $\alpha$, the depth H of liquid in the tank can be deduced immediately.

The angle of rotation $\alpha$ of the pulley is measured by means of the device shown in FIGS. 2 and 3: the shaft of the pulley 4 is connected by a magnetic coupling 6, 7 for transmitting the motion of the pulley to a toothed wheel 8 without backlash and while ensuring fluid-tightness. The toothed wheel 8 drives a smaller diameter toothed wheel 9 so as to magnify the rotation of the pulley (for example by a ratio of 1 to 10). In order to avoid any backlash in the transmission, a spiral spring 10 is provided for taking up backlash by pressing the gearwheel 9 against the associated drive wheel 8.

The wheel 9 is fixed to a code disk 11, in particular a binary encoded disk which moves between light emitting means 12 and light receiving means 13.

These means are shown in greater detail in FIG. 3: the light emitting means 12 are contained in a housing and comprise a plurality of optical fibers taken from a common bundle and terminating in the proximity of the disk surface at points S0, S1, . . . , so as to form a plurality of individual light-emitting sources. The coded disk may have twelve concentric tracks, for example, thereby providing a resolution of $2^{12}$ points, i.e. 4096 points.

Similarly, the light-receiving means 13 comprise a bundle of optical fibers whose ends R0, R1, . . . terminate along the other side of the disk facing respective ones of the sources S0, S1, . . .

FIG. 4 is a plan view on a larger scale showing the structure of a binary code disk 11. The disk is a transparent disk including a series of opaque zones distributed round a series of concentric ring tracks (12 in the present example), and disposed opposite respective ones of the sources S0, S1, . . . . In conventional manner, the disk is divided into a plurality of sectors (4096 in the present example) whose binary codes are determined by the presence or the absence of opaque zones on the various tracks occupying each sector. The binary code may be pure binary, binary coded decimal (BCD), or any other appropriate binary code.

Twelve-track coding which provides a resolution of 4096 points makes it possible to obtain millimeter accuracy over a depth of about 4 meters, as mentioned above, which is particularly advantageous when measuring the level of fuel in large refinery tanks which may be as much as eighty meters in diameter.

In accordance with an advantageous feature of the invention, the interval x between successive sectors is not constant, but decreases as a function of the angle of rotation so as to compensate for the non-linearity due to the cos $\alpha$ term in equation 3, which non-linearity is sensitive, above all, to large values of $\alpha$.

Thus, the digitized information available at the outlet from the light-receiving means 13 varies linearly with the depth of liquid in the tank, thereby making it suitable for immediate use without requiring any intermediate correction.

FIGS. 5 and 6 show a concrete embodiment of the invention implementing the diagrammatic representation of above-described FIGS. 1 and 2 and showing structural details which make it possible to obtain very high measuring accuracy while maintaining fluid-tightness and avoiding any backlash in transmission.

The pulley-counterweight assembly is housed in a housing 1' which may be mounted on top of the liquid tank (not shown) by means of a bottom flange 23. The space inside the housing is as fluid-tight as possible: its bottom (FIG. 5) is provided with a plate 16 having a hole for passing the thread 3, while its front and back faces (FIG. 6) are respectively provided with a disk 21 and a removable sleeve 1" in the form of a cylindrical cup. Another cylindrical sleeve 14 is provided inside the housing, with one end of the sleeve 14 being bolted to the housing 1' and the other end being closed by a plate 14'. The pulley 4 is disposed inside the sleeve 14 and it is preferably supported on knife edges. An arm 5' fixed to the pulley 4 and terminated by the counterweight 5 is free to move through a slot 15 which subtends an angle of about 50°.

Motion is transmitted between the pulley 4 and the code disk 11 as shown diagrammatically in FIG. 2, but the details can be seen more clearly in FIG. 6.

A shaft 4' fixed to the pulley 4 and coaxial therewith carries the drive member 6 of the magnetic coupling 6, 7, which member is housed inside the removable sleeve 1" close to the bottom thereof. On the other side of the removable sleeve 1" there is the driven member 7 of the magnetic coupling which is preferably rotatably mounted on a shaft 18 carried by said removable sleeve. Motion is thus transmitted through the cylindrical side wall of the sleeve without harming the fluidtightness of the system, which is ensured by a sealing ring 17.

Outside the housing 1', 1", the motion is transmitted without backlash via the toothed wheel 8 which is fixed to the driven member 7 and which meshes with the toothed wheel 9 which is fixed to the code disk 11 and which is coaxial therewith. The toothed wheel 8 is preferably limited to a toothed sector and is fixed to the driven member 7 as shown in FIGS. 5 and 6.

The code disk 11 is properly positioned by means of a bracket 19 fixed to the housing 1' so that it can move freely between the means 12 and 13 whose optical fibers are collected together in this case into a single bundle 20. The assembly is finally protected by a cover 22 which is advantageously made of transparent material.

Naturally the invention is not limited to the above-described embodiment but covers any variant which uses equivalent means to provide the characteristics which appear in the claims.

I claim:

1. Apparatus for measuring the level of a flammable liquid, in particular a cryogenic liquid, contained in a closed receptacle, the apparatus comprising:
   a vertical elongate plunger freely suspended at its top end from a thread so as to be partially immersed in the liquid;
   a housing mounted at the top of the receptacle and containing a pulley which is rotatable through no more than one-fourth of a turn, the pulley serving to wind the plunger suspension thread and being connected to a counterweight in such a manner that the pulley-counterweight assembly serves to compensate for the weight of the plunger as reduced by the Archimedes displacement thrust exerted on the plunger by the liquid, with the angular position of the pulley-counterweight assembly varying as a function of the depth to which the plunger is immersed, and consequently as a function of the depth of the liquid in the receptacle; and
   means for measuring and digitizing the angular position of the pulley, said means comprising a binary encoded disk mounted outside the housing in which the pulley-counterweight assembly is housed, together with light-emitting means and light-receiving means between which the disk moves, and a magnetic coupling for transmitting motion from the pulley to the disk through the housing,
   wherein the interval between successive sectors constituting the binary coding on the disk decrease as a function of the angle of rotation, in accordance with a mathematical law which is selected so that the said interval varies in such a manner as to compensate for the non-linearity due to the inclination of the counterweight as it moves, such that the digitized data available at the output from the light-receiving means varies linearly with the level of the liquid in the receptacle.

2. Apparatus according to claim 1, in which the light-emitting means and the light-receiving means are constituted by a bundle of optical fibers terminating in the proximity of the coded regions of the disk.

3. Apparatus according to claim 1, wherein the housing in which the pulley and counterweight assembly is received includes a removable sleeve in the form of a cylindrical cup serving to close said housing in sealed manner and providing magnetic coupling for transmitting motion through the cylindrical side wall of said sleeve.

4. Apparatus according to claim 3, wherein the motion is transmitted outside the housing without backlash by a first toothed wheel fixed to the driven member of the magnetic coupling and meshing with a smaller-diameter second toothed wheel which is coaxial with the disk.

5. Apparatus according to claim 4, wherein the driven member of the magnetic coupling is mounted on a shaft which is fixed to the cylindrical sleeve and which projects from the bottom thereof, and wherein a spiral spring is provided for taking up backlash by pressing the second toothed wheel which is coaxial with the disk against the driving first toothed wheel.

* * * * *

UNITED STATES PATENT AND TRADEMARK OFFICE
CERTIFICATE OF CORRECTION

PATENT NO. : 4,821,570
DATED : April 18, 1989
INVENTOR(S) : Danny J. Khoi, Asieres, France It is certified that error appears in the above-identified patent and that said Letters Patent is hereby corrected as shown below:

In the patent heading under "[73] Assignee"

The word "Signalization" should be Signalisation.

Signed and Sealed this

Twenty-second Day of May, 1990

Attest:

HARRY F. MANBECK, JR.

*Attesting Officer*

*Commissioner of Patents and Trademarks*